US008103062B2

(12) United States Patent
Abe et al.

(10) Patent No.: US 8,103,062 B2
(45) Date of Patent: Jan. 24, 2012

(54) VIDEO PROCESSING APPARATUS

(75) Inventors: Mototsugu Abe, Kanagawa (JP);
Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1052 days.

(21) Appl. No.: 11/466,519

(22) Filed: Aug. 23, 2006

(65) Prior Publication Data

US 2007/0053660 A1    Mar. 8, 2007

(30) Foreign Application Priority Data

Sep. 2, 2005    (JP) ............................... P2005-255487

(51) Int. Cl.
*G06K 9/00*    (2006.01)

(52) U.S. Cl. .......................... 382/118; 382/190; 382/181

(58) Field of Classification Search .................. 382/101, 382/103, 108, 118, 181, 195, 190, 141, 232
See application file for complete search history.

(56) References Cited

U.S. PATENT DOCUMENTS

| 5,012,522 | A  | * | 4/1991  | Lambert ....................... 382/118 |
| 6,430,306 | B2 | * | 8/2002  | Slocum et al. ................. 382/118 |
| 6,639,998 | B1 | * | 10/2003 | Lee et al. ...................... 382/103 |
| 2002/0031262 | A1 | * | 3/2002  | Imagawa et al. ............. 382/190 |
| 2003/0103647 | A1 |   | 6/2003  | Rui et al. |
| 2005/0246331 | A1 |   | 11/2005 | De Vorchik et al. |

FOREIGN PATENT DOCUMENTS

| JP | 2000-232638 | 8/2000 |
| JP | 2001-167110 | 6/2001 |
| JP | 2002-335473 | 11/2002 |
| JP | 2004-192637 | 7/2004 |
| JP | 2004-199669 | 7/2004 |
| JP | 2005-025413 | 1/2005 |
| JP | 2005-099953 | 4/2005 |
| JP | 2005-227957 | 8/2005 |
| WO | WO0141064 | 6/2001 |
| WO | 01/82041 A2 | 11/2001 |

OTHER PUBLICATIONS

European Search Report corresponding to European Serial No. 06018105.4 dated Feb. 18, 2010.
Japanese Patent Office Action corresponding to Japanese Publication No. 2005-255487 dated Oct. 5, 2010.
European Patent Office, Communication with extended search report issued in Patent Application 06018105.4, on Dec. 1, 2010.
Japanese Office Action dated Jun. 7, 2011 for Application No. JP2005-25547.
Japanese Office Action dated Mar. 9, 2011 for JP Application No. 2005-255487.

* cited by examiner

*Primary Examiner* — Samir Ahmed
*Assistant Examiner* — Ruiping Li
(74) *Attorney, Agent, or Firm* — SNR Denton US LLP

(57) ABSTRACT

A video processing apparatus includes: face-area detection means for detecting a face area included in a frame forming video data; trace-generation means for generating a frame identification corresponding to a start and an end of a trace including, as a unit, a set of frames from an appearance of the face area to a disappearance on the basis of the detection; representative face-area information generation means for selecting a representative face area from the face area included in frames forming the trace and generating representative face-area information representing contents of the representative face area; and video-data appended information generation means for generating video-data appended information relating the frame identification corresponding to a start and an end of the trace to the representative face-area information for the video data.

11 Claims, 15 Drawing Sheets

FIG. 5
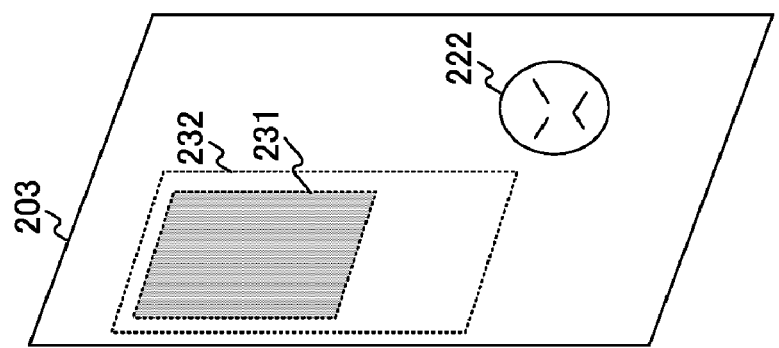
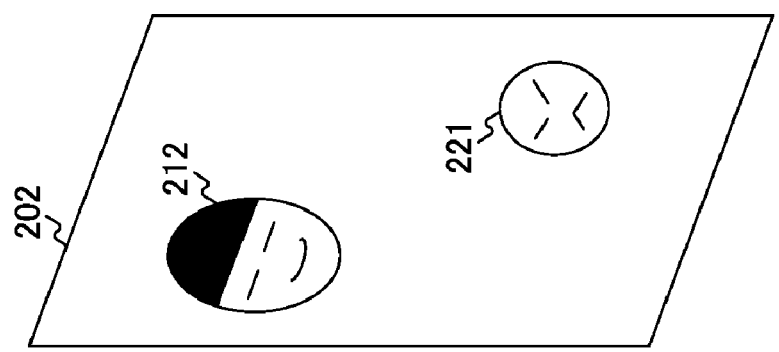

FIG. 7

| FACE-CHARA-CTERISTIC-ID 4421 | FACE-AREA CHARACTERISTIC DATA 4422 |
|---|---|
| CHAR-ACTERISTIC-A | FACE-AREA CHARACTERISTIC DATA-A |
| CHAR-ACTERISTIC-B | FACE-AREA CHARACTERISTIC DATA-B |
| ...... | ...... |

| TITLE 4601 | TRACE INFORMATION 4602 |
|---|---|
| TITLE-A | TRACE INFORMATION-A, TRACE INFORMATION-B, TRACE INFORMATION-C,..... |
| TITLE-B | TRACE INFORMATION-A, TRACE INFORMATION-B, TRACE INFORMATION-C,..... |
| TITLE-C | TRACE INFORMATION-A, TRACE INFORMATION-B, TRACE INFORMATION-C,..... |
| ..... | ..... |

4600

VIDEO PROCESSING APPARATUS

CROSS REFERENCES TO RELATED APPLICATIONS

The present invention contains subject matter related to Japanese Patent Application JP 2005-255487 filed in the Japanese Patent Office on Sep. 2, 2005, the entire contents of which are incorporated herein by reference.

BACKGROUND OF THE INVENTION

1. Field of the Invention

The present invention relates to a video processing apparatus for detecting a face area from video data. More particularly, the present invention relates to a video processing apparatus for tracing a face area from the appearance to the disappearance of the face area, and a method of this processing and a program for causing a computer to execute this method.

2. Description of the Related Art

It is difficult to grasp the contents of video data in a short period of time unlike still image data. In order to grasp the contents of video data in a short period of time, techniques, such as high-speed reproduction, for example triple-speed playback, etc., a plurality of displays of thumbnails of predetermined scenes in video data, etc., are used.

However, it is hard to say that the contents of video data can be grasped in a short period of time using as high speed as triple-speed playback. On the other hand, if a reproduction speed is increased, there is a limit of a reproduction speed as long as human eyes can follow. Also, in the method of displaying thumbnails of predetermined scenes in video data, the scenes representing the characteristics of video data are not always displayed as thumbnails, and thus it is not sufficient to grasp the contents of the video data by the techniques.

In order to grasp the contents of such video data, it is effective to pay attention to a person appearing in the video data. In general, persons often appear in video data. In recent years, much research on face-detection techniques has been conducted. Technological developments have been carried out in order to grasp persons in video data using the face-detection techniques.

For example, there is a technique in which a moving object is detected from video data, a determination is made on whether the moving object is a person by a face-detection technique, and a predetermined number of frames are selected from the video data including that person to display the frames (for example, refer to Japanese Unexamined Patent Application Publication No. 2000-232638 (FIG. 1)). Also, there is a technique in which face areas are extracted from the frames forming video data, all the extracted face areas are grouped for each person, and a representative face area of that person is displayed from the grouped face areas (for example, Japanese Unexamined Patent Application Publication No. 2001-167110 (FIG. 1))

SUMMARY OF THE INVENTION

However, not-moving objects are not detected by the above-described technique on a moving object, and thus the technique is not allowed to be directly used for all video data in general. Also, in general, in order to detect a face area from a frame, it is ideal for a face detection technique to enable detection without omission when face areas are included in frames as shown in FIG. 15A. However, by the face detection technique at the current stage, a detection omission may occur even if face areas are included in frames as shown in FIG. 15B. In the above-described technique in which a representative face area of a person is displayed from the grouped face areas, the extraction of face areas from frames is based on the detection of face areas from frames. However, no countermeasures against the detection omission of face areas are taken. Accordingly, it is difficult to fully grasp the connection of face areas in timeline without change. Thus, there is a problem in that the contents of video data become difficult to be grasped.

Accordingly, it is desirable to provide a video processing apparatus for generating video-data appended information which relates a face area to information from the appearance of the face area to the disappearance.

According to an embodiment of the present invention, there is provided a video processing apparatus including: face-area detection means for detecting a face area included in a frame forming video data; trace-generation means for generating a frame identification corresponding to a start and an end of a trace including, as a unit, a set of frames from an appearance of the face area to a disappearance on the basis of the detection; representative face-area information generation means for selecting a representative face area from the face area included in frames forming the trace and generating representative face-area information representing contents of the representative face area; and video-data appended information generation means for generating video-data appended information relating the frame identification corresponding to a start and an end of the trace to the representative face-area information for the video data. Thus, it brings about an operation of generating video-data appended information relating a face area to information from the appearance of the face area to the disappearance. Accordingly, it is possible to efficiently manage many persons appearing in a vast number of frames.

Also, in the above-described embodiment, the trace-generation means may include: trace-identification giving means for giving the same trace-identification to frames from the appearance of the face area to the disappearance; face-area prediction means for predicting the face area in a current frame on the basis of the face area in prior frames having the same trace-identification given; trace-determination means for determining whether the face area in the current frame detected by the face-area detection means on the basis of the face area in the predicted current frame is included in the trace and adding the current frame to the trace if determined to be included in the trace; and end-frame determination means for determining any one of the frames to be an end frame of the trace if the face area in the current frame detected by the face-area detection means is determined not to be included in the trace. Thus, it automatically brings about an operation of generating video-data appended information relating a face area to information from the appearance of the face area to the disappearance by supplying video data.

Also, the face-area prediction means may predict the face area in the current frame by linear prediction on the basis of the face area in a prior frame having the same trace-identification given. Thus, it brings about an operation of obtaining high-precision prediction values, such as the positions of the face area, etc.

Also, the trace-determination means may compare the face area in the predicted current frame and the face area in the current frame detected by the face-area detection means to determine whether a difference in position and a difference in attribute are predetermined threshold values or less, if the differences are the predetermined threshold values or less, a determination may be made that the face area in the current frame is included in the trace, and the current frame may be included in the trace. Thus, even if there is an error between the actual detection value and the prediction value, it brings about an operation of generating information from the appearance of the face area to the disappearance.

Also, the trace-determination means may determine whether the difference in the attribute is a predetermined threshold value or less on the basis of at least one factor of a size of the face area, a luminance distribution of the face area, a color distribution of the face area, a shape of the face area, and a pattern of the face area as the attribute. Thus, it brings about an operation of comparing the actual detection value and the prediction value by a factor of the size of the face area, the luminance distribution of the face area, the color distribution of the face area, the shape of the face area, the pattern of the face area, etc.

Also, the end-frame determination means may determine which of the frames to be the end frame on the basis of a determination result of the trace-determination means on subsequent frames when the face area in the current frame detected by the face-area detection means is not included in the trace. Thus, even if there is a detection omission of a face area, it brings about an operation of generating information from the appearance of the face area to the disappearance.

Also, in the above-described embodiment, the representative face-area information generation means may select the representative face area on the basis of at least one factor of a size of the face area in frames forming the trace, a frequency distribution in the face area, a shade distribution of color in the face area, and a color distribution in the face area. Thus, it brings about an operation of allowing a user to select an easy-to-see face area as a representative face area.

Also, in the above-described embodiment, the representative face-area information generation means may generate a frame number of the frame including the representative face area, and a position and a size of the representative face area in a frame including the representative face area as the representative face-area information. Thus, it brings about an operation of reducing the amount of information of a representative face area in video-data appended information.

Also, in the above-described embodiment, the representative face-area information generation means may generate the representative face area cut out from a frame including the representative face area as the representative face-area information. Thus, it brings about an operation of generating a face area included in video-data appended information.

Also, the video processing apparatus may further include: face-area characteristic data holding means for holding face-area characteristic data describing a predetermined face-area characteristic and face-characteristic-ID identifying the face-area characteristic data in connection with each other; face-area characteristic data extracting means for extracting face-area characteristic data from the representative face area cut out by the face-area information generation means; and face-area characteristic data retrieval means for retrieving the face-area characteristic data similar to the extracted face-area characteristic data by the face-area characteristic data holding means, and giving the face-area characteristic identification to the extracted face-area data, wherein the video-data appended information generation means may generate the video-data appended information including the face-area characteristic identification. Thus, it brings about an operation of generating video-data appended information including a face-characteristic-ID related to a similar face area.

Also, a new face-characteristic-ID may be given to the extracted face area data when the face-area characteristic data similar to the face-area characteristic data extracted by the face-area characteristic data retrieval means is not retrieved by the face-area characteristic data holding means. Thus, it brings about an operation of giving a new face-characteristic-ID even if there is no similar face area.

Also, according to an embodiment of the present invention, there is provided a video processing apparatus including: video-data appended information holding means for holding video-data appended information, the information relating the frame identification corresponding to a start and an end of a trace including, as a unit, a set of frames from an appearance of a face area to a disappearance to representative face-area information representing content of representative face area selected from the face area included in frames forming the trace; operation-menu list generation means for generating a list of operation menu on the video data on the basis of the video-data appended information; display means for displaying operation menu on the video data; and operation input means for accepting a selection of the operation menu on the video data. Thus, it brings about an operation of managing video data on the basis of video-data appended information relating a face area to information from the appearance of the face area to the disappearance.

Also, in the above-described embodiment, the video processing apparatus may further include: face-area acquisition means for acquiring the video-data appended information on the selected video data when predetermined video data is selected from a list of the video data by the operation means, and displaying the face area on the basis of the representative face-area information included in the video-data appended information. Thus, it brings about an operation of displaying a face area representing the scene for each scene at which face areas appears continuously in video data.

Also, the video processing apparatus may further include: when any one of the face areas displayed by the face-area acquisition means is selected by the operation means, similar face-area retrieval means for retrieving video-data appended information having the same face-area characteristic identification as that of the selected face area and displaying the retrieval result, wherein the video-data appended holding means may hold face-area characteristic identification given to face-area characteristic data describing a predetermined face-area characteristic of the video data and the representative face-area information in connection with each other. Thus, it brings about an operation of retrieving video data on the basis of a similar face area.

Also, in the above-described embodiment, the video processing apparatus may further include: face timeline generation means for acquiring the video-data appended information on the selected video data when predetermined video data is selected from a list of the video data by the operation means, and generating a face timeline display including time display corresponding to the trace and the face area corresponding to the representative face-area information. Thus, it brings about an operation of displaying a face area representing the scene and time of the scene for each scene at which face areas appears continuously in video data.

Also, according to an embodiment of the present invention, there is provided a method of processing or a program for causing a computer to execute processing, including the steps of: face-area detecting for detecting a face area included in a frame forming video data; trace-generating for generating a frame identification corresponding to a start and an end of a trace including, as a unit, a set of frames from an appearance of the face area to a disappearance on the basis of the detection; representative face-area information generating for selecting a representative face area from the face area included in frames forming the trace and generating representative face-area information representing contents of the representative face area; and video-data appended information generating for generating information relating the frame identification corresponding to a start and an end of the trace to the representative face-area information for the video data as video-data appended information appended to the video data. Thus, it brings about an operation of generating video-data appended information relating a face area to information from the appearance of the face area to the disappearance.

According to the present invention, it is possible to obtain excellent advantages in that video-data appended information relating a face area to information from the appearance of the face area to the disappearance can be generated.

BRIEF DESCRIPTION OF THE DRAWINGS

FIG. 5 is a diagram illustrating a determination method of an end frame in another trace than the one in FIG. 4;

FIG. 7 is a diagram illustrating the contents held by a face-area characteristic data holding section 442 in the embodiment of the present invention;

FIG. 8 is a diagram illustrating the video-data appended information held by a video-data appended information holding section 460 in the embodiment of the present invention;

DESCRIPTION OF THE PREFERRED EMBODIMENTS

Next, a detailed description will be given of an embodiment of the present invention with reference to the drawings.

Figure 1:
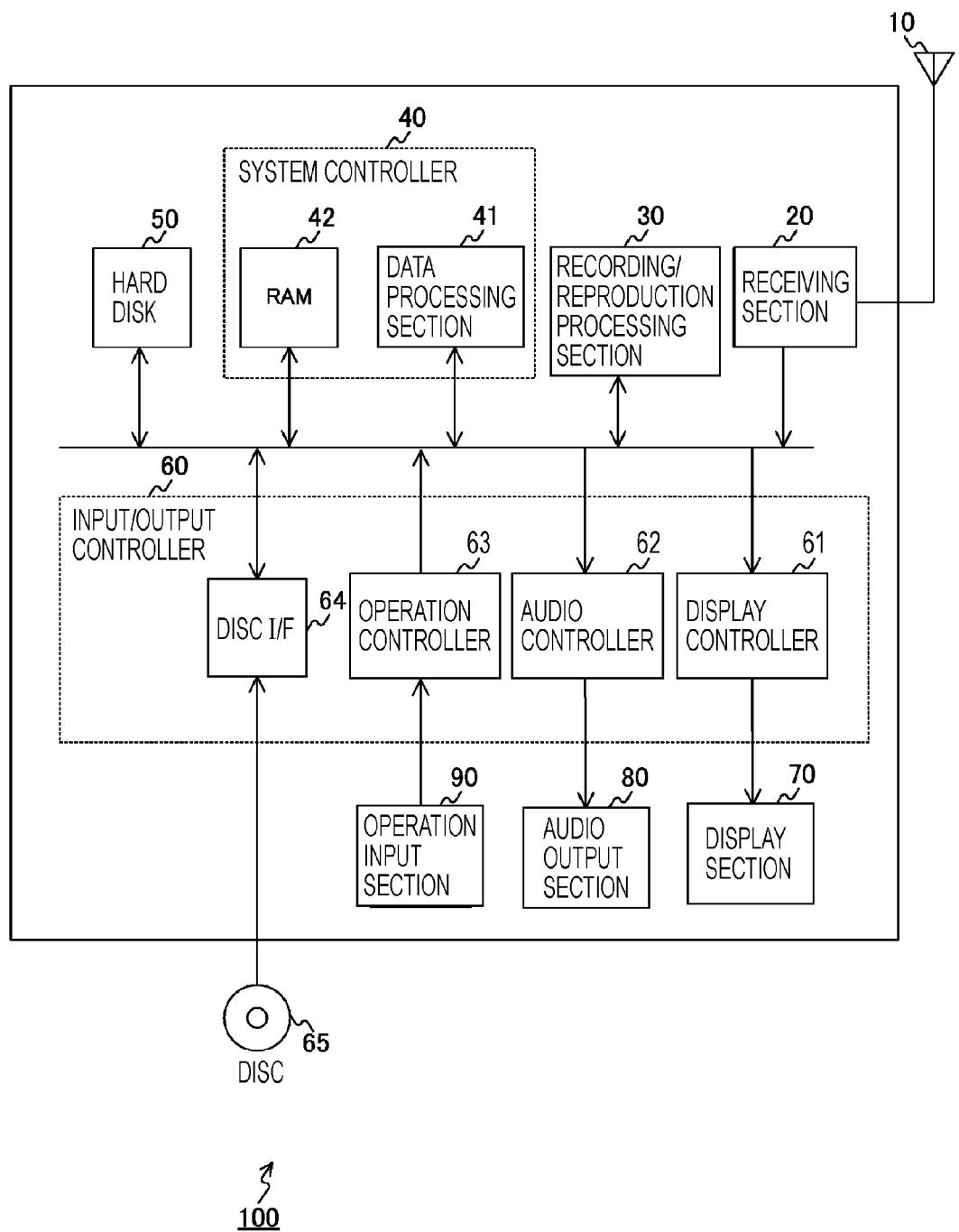
FIG. 1 is a diagram illustrating an example of the configuration of a video processing apparatus 100 according to an embodiment of the present invention.

FIG. 1 is a diagram illustrating an example of the configuration of a video processing apparatus 100 according to the embodiment of the present invention. The video processing apparatus 100 includes an antenna 10, a receiving section 20, a recording/reproduction section 30, a system controller 40, a hard disk 50, an input/output controller 60, a display section 70, an audio output section 80, and an operation input section 90.

The antenna 10 plays a role of catching radio waves transmitted through space. The receiving section 20 performs processing, such as demodulation processing, D/A conversion, etc., on the received data supplied from the antenna 10.

The recording/reproduction section 30 performs encoding, etc., on the data supplied from the receiving section 20 in accordance with, for example an MPEG-2 (Moving Picture Expert Group-2) standard. The encoded data is supplied to the hard disk 50 or a disc interface 64. Also, the recording/reproduction section 30 performs decoding, etc., on the data supplied from the hard disk 50 or the disc interface 64. The decoded data is supplied to a display controller 61 and an audio controller 62.

The system controller 40 includes a data processing section 41 and a RAM (Random Access Memory) 42. The data processing section 41 controls the entire processing of the video processing apparatus 100 according to the embodiment of the present invention, and uses the RAM 42 as a working area. The hard disk 50 stores the data having been subjected to predetermined processing in the recording/reproduction section 30.

The input/output controller 60 includes a display controller 61, an audio controller 62, an operation controller 63, and the disc interface 64. The display controller 61 supplies the video data supplied from the recording/reproduction section 30, etc., to the display section 70 which includes, for example a LCD (Liquid Crystal Display), etc. The display section 70 outputs the video data.

The audio controller 62 supplies the audio data supplied from the recording/reproduction section 30, etc., to the audio output section 80. The audio output section 80 outputs the audio data. The operation controller 63 transmits the operation signal from the operation input section 90 to the data processing section 41. The data processing section 41 determines which operation is carried out in the operation input section 90, and performs control processing in accordance with the determination result.

The disc interface 64 writes the data, which has been subjected to predetermined processing in the recording/reproduction section 30, to a disc 65. Also, the disc interface 64 reads data from the disc 65, and supplies it to the recording/reproduction section 30. In this regard, the disc 65 is assumed to be an optical disc, such as a CD, a DVD, etc. Also, it is possible to use a storage medium other than a disc.

In the embodiment of the present invention, the video data supplied from a broadcasting station (not shown) is received by the antenna 10, and is held by the hard disk 50. The face areas included in the frames forming the video data held by this hard disk 50 are detected by the data processing section 41. On the basis of the detection of the face areas, a process from the appearance of a face area of a same person in a frame to the disappearance is considered to be one unit (in the following, called a trace). Information related to the scenes on which the face areas of the same person appear continuously is included in the video-data appended information of video data. In this regard, the trace information includes a frame number corresponding to a start and an end of a trace described below, representative face-area information, and a face-characteristic-ID.

In this regard, in the above description, a description has been given of the example in which video data is supplied from a broadcasting station. However, the present invention is not limited to this. For example, video data may be captured by a home video camera. In this case, it is assumed that a disc on which video data captured by a home video camera is read through the disc interface 64, and is subjected to the above-described processing.

Figure 2:
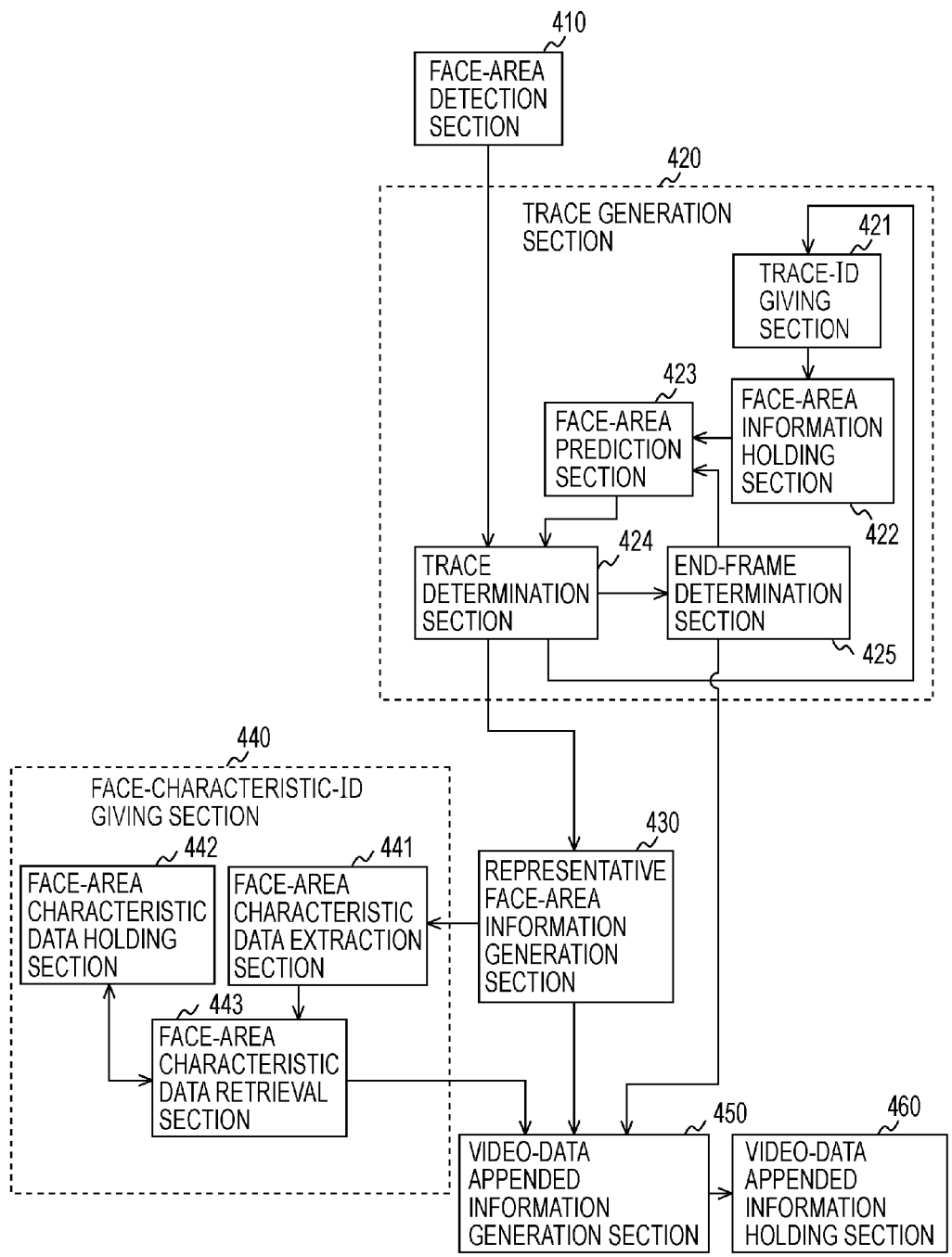
FIG. 2 is a diagram illustrating an example of the functional configuration for generating video-data appended information of video data in the embodiment of the present invention.

FIG. 2 is a diagram illustrating an example of the functional configuration for generating video-data appended information of video data in the embodiment of the present invention. This function includes a face-area detection section 410, a trace generation section 420, a representative face-area information generation section 430, a face-characteristic-ID giving section 440, a video-data appended information generation section 450, and a video-data appended information holding section 460.

The face-area detection section 410 detects a face area from the supplied frame. Specifically, the face-area detection section 410 detects the existence of a face area in a frame, the position of the face area, and the attribute of the face area, such as the size, the luminance distribution, the color distribution, the pattern, the shape, etc., of the face area. Also, the face-area detection section 410 may detect the luminance distribution, the color distribution, the pattern, the shape, etc., of the vicinity of the face area as the attribute of the face area. In this regard, in the following description, the existence of a face area in a frame, the position of the frame, and the attribute of the frame are appropriately called "face-area information" in a generic term. The face-area detection section 410 supplies the face-area information and the frames to the trace generation section 420.

The trace generation section 420 generates a pair of the frame numbers corresponding to the start and the end of the trace on the basis of the face-area information. The trace generation section 420 includes a trace-ID giving section 421, a face-area information holding section 422, a face-area prediction section 423, a trace determination section 424, and an end-frame determination section 425.

The trace-ID giving section 421 gives a trace-ID to the position and the attribute of the face area supplied from the trace determination section 424. The trace-ID is a unique identification being given to a trace for distinguishing each trace. The position and the attribute of the face area to which the trace-ID is given in the trace-ID giving section 421 are supplied to the face-area information holding section 422. The face-area information holding section 422 holds the position and the attribute of the face area supplied by the trace-ID giving section 421 for each trace-ID.

The face-area prediction section 423 predicts the position and the attribute of the face area in the next frame for each trace-ID on the basis of the position and the attribute of the face area held for each trace-ID in the face-area information holding section 422. In this regard, it is assumed that the face-area prediction section 423 predicts the position and the attribute of the face area by linear prediction. Here, the linear prediction speculates the nth value from the (n−1)th value and before.

The trace determination section 424 determines in which trace the face area of the current frame detected by the face-area detection section 410 is included on the basis of the prediction value of the position and the attribute of the face area in the next frame for each trace-ID supplied from the face-area prediction section 423.

Specifically, if the difference between the prediction value of the position and the attribute of the face area in the next frame for each trace-ID supplied from the face-area prediction section 423 and the position and the attribute of the face area in the current frame detected by the face-area detection section 410 is not more than a predetermined threshold value, the current frame is determined to be a next frame forming the trace, and the current frame is added to the trace.

The trace determination section 424 supplies the position and the attribute of the face area in the current frame to the trace-ID giving section 421. If the current frame is within a prediction, the trace-ID giving section 421 gives the trace-ID given to the predicted trace to the current frame, and causes the face-area information holding section 422 to hold it.

On the other hand, if the difference between the prediction value of the position and the attribute of the face area in the next frame for each trace-ID supplied from the face-area prediction section 423 and the position and the attribute of the face area in the current frame detected by the face-area detection section 410 is more than a predetermined threshold value, the current frame is determined not to be forming any trace, and the current frame is not added to the trace. In this case, the current frame is handled as a newly appeared face area, and the trace determination section 424 supplies the position and the attribute of the face area in the current frame to the trace-ID giving section 421. The trace-ID giving section 421 gives a new trace-ID to the current frame, and causes the face-area information holding section 422 to hold it.

Also, if there is not the position and the attribute of the face area in the current frame corresponding to the prediction value of the position and the attribute of the face area in the next frame for each trace-ID supplied from the face-area prediction section 423, the trace determination section 424 determines that the trace corresponding to the prediction value might be terminated, and supplies that notification and the current frame to the end-frame determination section 425.

When the end-frame determination section 425 receives the above-described notification from the trace determination section 424, the end-frame determination section 425 determines that the frame is the end frame of the trace. If there is no face area corresponding to the trace in the frames during the elapse of a predetermined time period (for example about 0.5 second) from the current frame, the end-frame determination section 425 determines that the frame when the above-described notification was received is the end frame.

If there is not the position and the attribute of the face area in the current frame corresponding to the prediction value of the position and the attribute of the face area in the next frame for each trace-ID supplied from the face-area prediction section 423, the frame at that time is considered to be an end frame. However, the face-area detection section 410 might omit detecting a face area, and thus the face areas detected during the elapse of a predetermined time period from the current frame are also targeted.

Also, the end-frame determination section 425 may calculate the luminance distribution, the color distribution, the pattern, the shape, etc., of the vicinity of the prediction value of the face-area position from the current frame supplied from the trace determination section 424, and compares the calculated value and the values of the luminance distribution, the color distribution, the pattern, the shape, etc., of the face areas included in the other frames forming the trace. If the two values are not similar, that current frame may be determined to be an end frame. If the two values are determined to be similar, it is assumed that a face area has failed to be detected for some reason, and the current frame supplied from the trace determination section 424 is not determined to be an end frame.

The representative face-area information generation section 430 selects a representative face area from the face areas included in the frames forming the trace supplied from the trace determination section 424, and generates representative face-area information representing the contents of the representative face area. In this regard, there may be two representative face areas or more. The representative face-area information is supplied to the video-data appended information generation section 450 and the face-characteristic-ID giving section 440.

The representative face area is selected on the basis of factors, such as the size of a face area, a frequency distribution of a face area, a shade distribution of a face area, a color distribution of a face area, etc. In this regard, the frequency distribution of a face area is used as an index for showing the blurredness of the face area, the shade distribution of a face area is used as an index for showing the contrast of the face area, and the color distribution of a face area is used as index for showing the color tone of the face area.

The representative face-area information is assumed to be, specifically, a representative face area selected on the basis of the above-described factors, which is cut out of the frame, that is to say, the video data of the representative face area portion itself. Also, the representative face-area information is assumed to be the information, such as the frame number of the frame including the representative face area, and the position, the size, etc., of the face area in the frame. It is possible to obtain the video data of the representative face area portion on the basis of the information such as the frame number of the frame including the representative face area, and the position, the size, etc., of the face area in the frame.

When the video data of the face area is displayed on the basis of the representative face-area information, the former of the representative face-area information has an advantage in that it is not necessary to cut out the video data of representative face area portion from the video data every time. On the other hand, the latter of the representative face-area information has an advantage in that it is possible to effectively use the memory area, because of not being the video data.

The face-characteristic-ID giving section 440 includes a face-area characteristic data extraction section 441, a face-area characteristic data holding section 442, and a face-area characteristic data retrieval section 443. The face-area characteristic data extraction section 441 extracts the characteristic data (in the following, called face-area characteristic data) of a face area from a representative face area on the basis of the representative face-area information supplied from the representative face-area information generation section 430. The extracted face-area characteristic data is supplied to the face-area characteristic data retrieval section 443.

In this regard, the face-area characteristic data is assumed to be a characteristic vector which numerically describes the shape of each fixture and the positional relationships, etc., by extracting the characteristic points representing the fixtures, for example eyes, a nose, and a mouth. However, the face-area characteristic data is not limited to this.

The face-area characteristic data holding section 442 holds the face-characteristic-ID and the face-area characteristic data in connection with each other. The face-characteristic-ID is the identification of the face-area characteristic data, and each of the face-area characteristic data to which the same face-characteristic-ID is given has a similar face area characteristic.

The face-area characteristic data retrieval section 443 retrieves the face-area characteristic data similar to the face-area characteristic data supplied from the face-area characteristic data extraction section 441 in the face-area characteristic data held by the face-area characteristic data holding section 442.

If the face-area characteristic data similar to the face-area characteristic data supplied from the face-area characteristic data extraction section 441 is retrieved in the face-area characteristic data held by the face-area characteristic data holding section 442, the same face-characteristic-ID as that of the retrieved face-area characteristic data is given to the face-area characteristic data supplied from the face-area characteristic data extraction section 441, and is supplied to the video-data appended information generation section 450. On the other hand, if the face-area characteristic data similar to the face-area characteristic data supplied from the face-area characteristic data extraction section 441 is not retrieved in the face-area characteristic data held by the face-area characteristic data holding section 442, a new face-area characteristic identification is given, and is supplied to the video-data appended information generation section 450.

In this regard, the face-area characteristic data, which is supplied to the face-area characteristic data retrieval section 443 and is provided with the face-characteristic-ID is also supplied to the face-area characteristic data holding section 442, and is held in connection with the face-characteristic-ID. Thus, the face-area characteristic data holding section 442 stores the face-area characteristic data related to the face-characteristic-ID.

The video-data appended information generation section 450 generates video-data appended information in which a frame number corresponding to the start and the end of a trace, representative face-area information, and face-characteristic-ID are related to video data. That is to say, the video-data appended information is the information in which the trace information described in FIG. 1 is related to video data. The generated video-data appended information is held in the video-data appended information holding section 460.

In this regard, these functions in FIG. 2 are performed, for example by the system controller 40 in FIG. 1.

Figure 3:
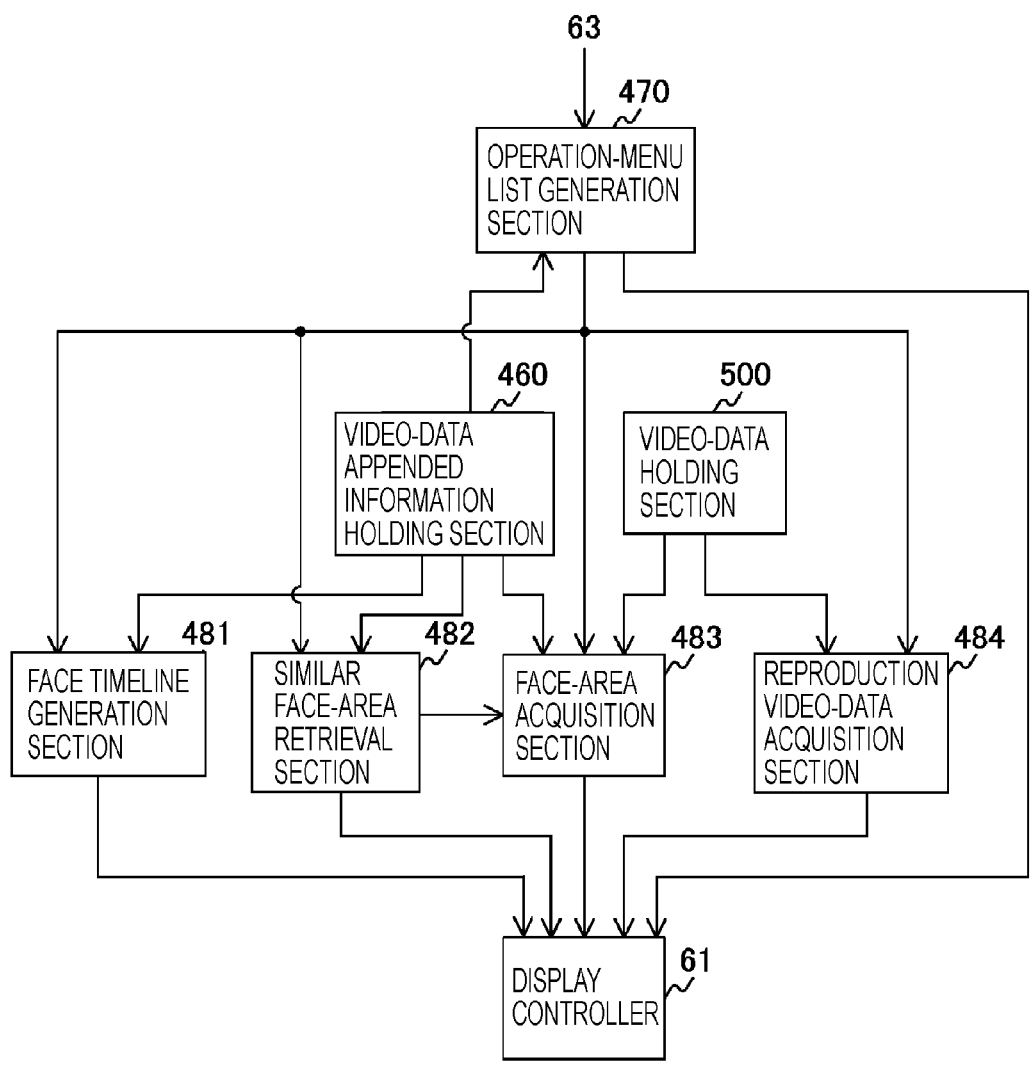
FIG. 3 is a diagram illustrating an example of the configuration of operational function using the video-data appended information generated in FIG. 2.

FIG. 3 is a diagram illustrating an example of the configuration of operational function using the video-data appended information generated in FIG. 2. The operational function includes an operation-menu list generation section 470, a video-data appended information holding section 460, a video-data holding section 500, a face timeline generation section 481, a similar face-area retrieval section 482, a face-area acquisition section 483, and a reproduction video-data acquisition section 484.

The operation-menu list generation section 470 generates a list of operation menu on the video data on the basis of the video-data appended information held by the video-data appended information holding section 460. Also, the operation-menu list generation section 470 gives an instruction to the face timeline generation section 481, the similar face-area retrieval section 482, the face-area acquisition section 483, and the reproduction video-data acquisition section 484, which are provided with a function corresponding to any one of the operation menu, in response to the selection with respect to the operation menu on video data from the operation input section 90.

The face timeline generation section 481 receives an instruction from the operation-menu list generation section 470, acquires the video-data appended information corresponding to the instruction from the video-data appended information holding section 460, and generates the face timeline display to be shown on the display section 70 on the basis of that video-data appended information.

Here, the face timeline display refers to a display including a time display corresponding to a trace in a predetermined video data and face areas corresponding to representative face-area information. The time display corresponding to the trace is generated by the frame numbers corresponding to the start and the end of the traces included in the video-data appended information.

The face-area acquisition section 483 receives an instruction from the operation-menu list generation section 470 or the similar face-area retrieval section 482, acquires the video-data appended information corresponding to the instruction from the video-data appended information holding section 460, and acquires the representative face area to be displayed on the display section 70 on the basis of the video-data appended information. Specifically, the face-area acquisition section 483 acquires the representative face area on the basis of the representative face-area information included in the video-data appended information.

If the contents of the representative face-area information is the video data of the face area itself, the face-area acquisition section 483 acquires the face areas from the video-data appended information holding section 460. On the other hand, if the contents of the representative face-area information is the frame number of the frame including the representative face area and information such as the position and the size of the representative face area in the frame, etc., the face-area acquisition section 483 acquires the corresponding frame from the video-data holding section 500, and acquires the face area from the frame.

The similar face-area retrieval section 482 receives an instruction from the operation-menu list generation section 470, and retrieves the face area and the similar face area corresponding to the instruction in the video-data appended information holding section 460 on the basis of the face-characteristic-ID in the video-data appended information held by the video-data appended information holding section 460. Specifically, the similar face-area retrieval section 482 retrieves the video-data appended information having the same face-characteristic-ID as the face-characteristic-ID of the face area instructed from the operation-menu list generation section 470. Then the similar face-area retrieval section 482 displays the corresponding face area on the display section 70 on the basis of the representative face-area information in the video-data appended information.

In this regard, in the embodiment of the present invention, if the contents of the representative face-area information is the video data of the face area itself, the similar face-area retrieval section 482 acquires the face area corresponding to the retrieved face-characteristic-ID from the video-data appended information holding section 460, and displays it on the display section 70. On the other hand, if the contents of the representative face-area information is the frame number of the frame including the representative face area and information such as the position and the size of the representative face area in the frame, etc., the similar face-area retrieval section 482 instructs the face-area acquisition section 483 to acquire the corresponding frame from the video-data holding section 500, to cut out the face area from the frame, and to display it on the display section 70.

The reproduction video-data acquisition section 484 receives an instruction from the operation-menu list generation section 470, acquires the video data corresponding to the instruction from the video-data holding section 500, and supplies it to the display controller 61.

Figure 4:
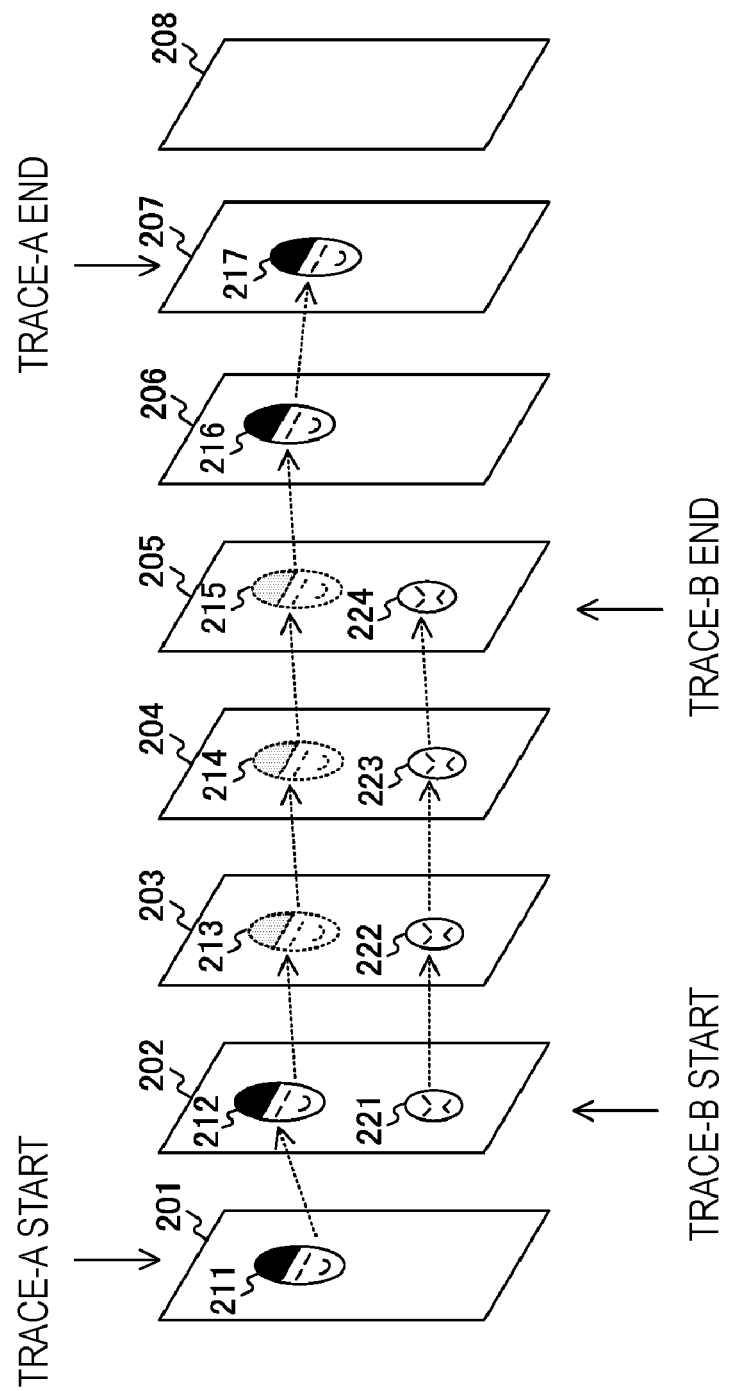
FIG. 4 is a diagram illustrating the state of trace generation in the embodiment of the present invention.

FIG. 4 is a diagram illustrating the state of trace generation in the embodiment of the present invention. In this regard, the face areas 213 to 215 are indicated by dotted lines in FIG. 4. This represents that there are face areas in reality, but the face-area detection section 410 failed to detect them. Also, the face areas indicated by solid lines represents the face areas detected by the face-area detection section 410.

First, the face area 211 is detected by the face-area detection section 410 in the frame 201, and the generation of the trace A is started. Next, the position and the attribute of the face area in the next frame 202 is predicted by the face-area prediction section 423 on the basis of the position and the attribute of the face area 211 in the frame 201.

In the frame 202, face areas 212 and 221 are detected by the face-area detection section 410, and a comparison is made between the position and the attribute of the face area predicted by the face-area prediction section 423 and the positions and the attributes of the face areas 212 and 221 detected in the frame 202. If the difference in the position and the attribute between both areas is not more than a threshold value, the frame 202 is added to the trace A.

In FIG. 4, the difference between the position and the attribute of the face area predicted by the face-area prediction section 423 and the position and the attribute of the face area 212 detected in the frame 202 is considered to be not more than a threshold value, and thus the frame 202 is added to the trace A.

On the other hand, the difference between the position and the attribute of the face area predicted by the face-area prediction section 423 and the position and the attribute of the face area 221 detected in the frame 202 is considered to be more than a threshold value, and thus the face area is regarded as a newly appeared face area, and a trace B is started.

Next, the face-area prediction section 423 makes a prediction on the position and the attribute of the face area in the next frame 203 in the trace A, and makes a prediction on the position and the attribute of the face area in the next frame 203 in the trace B.

The face area 222 is detected by the face-area detection section 410 in the frame 203, and a comparison is made between the prediction of the position and the attribute of the face area in the next frame 203 in the trace B and the position and the attribute of the face area 222 in the next frame 203. In FIG. 4, the difference between the prediction of the position and the attribute of the face area in the next frame 203 in the trace B and the position and the attribute of the face area 222 in the frame 203 is considered to be not more than a threshold value, and thus the frame 203 is added to the trace B.

For the frame B, the similar processing is performed in the frames 204 and 205, and the frame 205 prior to the frame 206, in which the face area disappears, becomes the end frame in the trace B. Accordingly, the start frame of the trace B becomes the frame 202, and the end frame of the trace B becomes the frame 205.

On the other hand, a face area 213 corresponding to the trace A is not detected in the frame 203. Thus, there is no target to be compared with the prediction on the position and the attribute of the face area in the next frame 203 in the trace A. In this case, the end frame of the trace A is considered to be 202. However, the probability of face detection by the face-area detection section 410 is not 100%, and thus there might be the face area 213 in the frame 203 in reality. Accordingly, in the embodiment of the present invention, even if the face area 213, which should be corresponding to the trace A in the frame 203, the end frame of the trace A is not determined immediately at this point in time. The end frame of the trace A is determined by taking into account the face areas of more subsequent frames.

In the trace A, the face areas 213 to 215 are not detected by the face-area detection section 410 in the frames 203 to 205. In the frame 206, the face area 216 is detected. When a comparison is made between the prediction by the face-area prediction section 423 on the position and the attribute of the face area in the frame 206 and the position and the attribute of the face area 216 detected in the frame 206, the difference between the two is considered to be not more than a threshold value, and thus the frame 206 including the face area 216 is added to the trace A. In this case, in the embodiment of the present invention, the face areas 213 to 215 are assumed to be detected in the frames 203 to 205, and thus the frames 203 to 205 are added to the trace A. In this regard, there is no limit on how many prior frames whose face-area states are processed as described above. However, for example the frames of about 0.5 second before are assumed to be processed as described above.

For the frame A, the similar processing is performed in the frames 207 and 208, and the frame 207 prior to the frame 208, in which the face area disappears, becomes the end frame in the trace A. Accordingly, the start frame of the trace A becomes the frame 201, and the end frame of the trace A becomes the frame 207.

FIG. 5 is a diagram illustrating a determination method of an end frame in another trace than the one in FIG. 4. In FIG. 4, if a face area is not detected, the detection results of the face areas of a few preceding frames are taken into account. However, in FIG. 5, an end frame of a trace is determined by an analysis of the frame in which a face area is failed to be detected.

FIG. 5 shows the frames 202 and 203 in FIG. 4. In the frame 203, the face-area detection section 410 does not detect a face area. However, the face-area prediction section 423 predicts the position and the attribute of the face area in the frame 203 on the basis of the frame 201 or the frame 202 prior to the frame 203. The predicted position is the area 231 of the frame 203.

In order to determine whether the frame 203 is the end frame of the trace A, the end-frame determination section 425 calculates the luminance distribution, the color distribution, the pattern, the shape, etc., of the area 231. The end-frame determination section 425 makes a comparison between the above calculated luminance distribution, color distribution, pattern, shape, etc., and the attribute including the luminance distribution, the color distribution, the pattern, the shape, etc., in the face area in the frame 203 predicted on the basis of the frame 201 or the frame 202.

As a result of the comparison between the two, if the luminance distribution, the color distribution, the pattern, the shape, etc., of the two are determined to be similar, it is assumed that a face area has failed to be detected for some reason, and the frame 203 is not determined to be the end frame. On the other hand, if the luminance distribution, the color distribution, the pattern, the shape, etc., of the two are determined to be not similar, the frame 203 is determined to be the end frame.

In this regard, in order to increase the precision of the end-frame determination, a vicinity area 232, which is an area in the vicinity of the above-described area 231, may be the target of the comparison, and the luminance distribution, the color distribution, the pattern, the shape, etc., of the vicinity area 232 may be calculated as described above.

Figure 6:
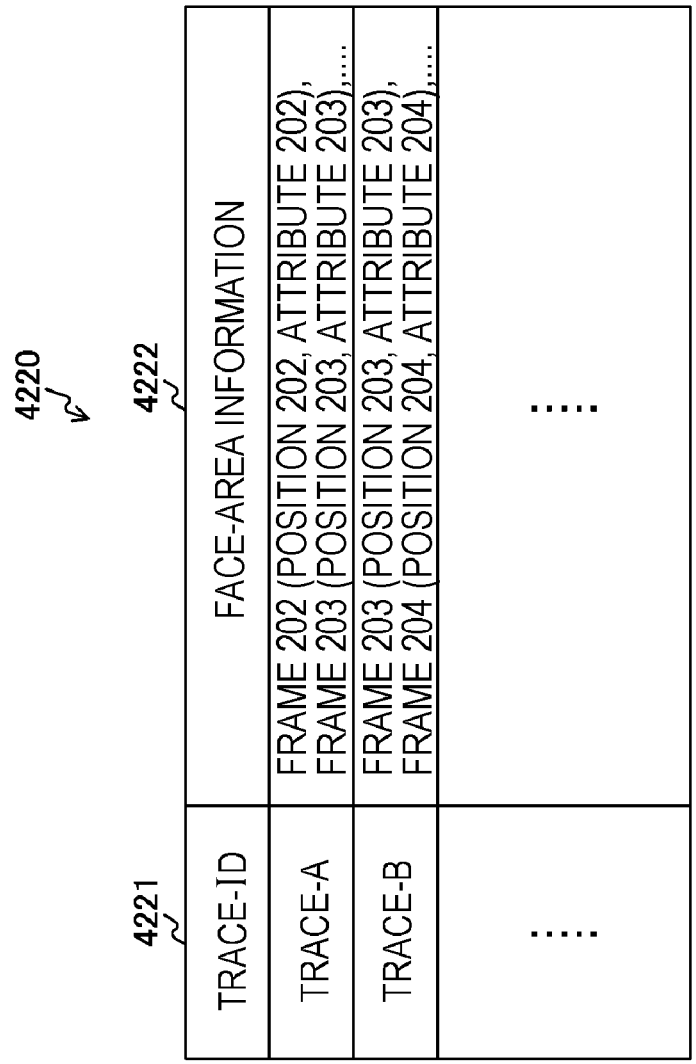
FIG. 6 is a diagram illustrating the contents held by a face-area information holding section 422 in the embodiment of the present invention.

FIG. 6 is a diagram illustrating the contents held by a face-area information holding section 422 in the embodiment of the present invention. The face-area information holding section 422 holds a face-area information table 4220. The face-area information table 4220 includes trace identification 4221 and face-area information 4222.

The trace identification 4221 is a unique identification given to each trace for distinguishing each trace, and is the same identification described in FIG. 2. Also, the face-area information 4222 is the information showing the position and the attribute of the face areas in a predetermined frame. In FIG. 6, for example a frame 202 (position 202, attribute 202) is shown. This means that the information indicates the position and the attribute of the face area in the frame 202. A trace may be formed in a plurality of frames, and thus the positions and the attributes of the face areas in a plurality of frames are held in the face-area information 4222 for one trace identification.

FIG. 7 is a diagram illustrating the contents held by a face-area characteristic data holding section 442 in the embodiment of the present invention. The face-area characteristic data holding section 442 holds a face-characteristic data table 4420. The face-characteristic data table 4420 includes a face-characteristic-ID 4421 and a face-area characteristic data 4422.

The face-characteristic-ID 4421 is the identification of the face characteristic data. As described in FIG. 2, the face characteristic data to which the same face-characteristic-ID is given has a similar characteristic of the face area to each other. In FIG. 7, the face-characteristic-ID includes "characteristic-A" and "characteristic-B". The face-area characteristic data 4422 is the same as the face characteristic data described in FIG. 2.

FIG. 8 is a diagram illustrating the video-data appended information held by a video-data appended information holding section 460 in the embodiment of the present invention. The video-data appended information 4600 includes titles 4601 of video data and trace information 4602. In video data, in general, there are a large number of states from the appearance of a face area to the disappearance. Thus, a lot of trace information is held for one title of video data. A description will be given of the specific contents of trace information in FIG. 9.

Figure 9:
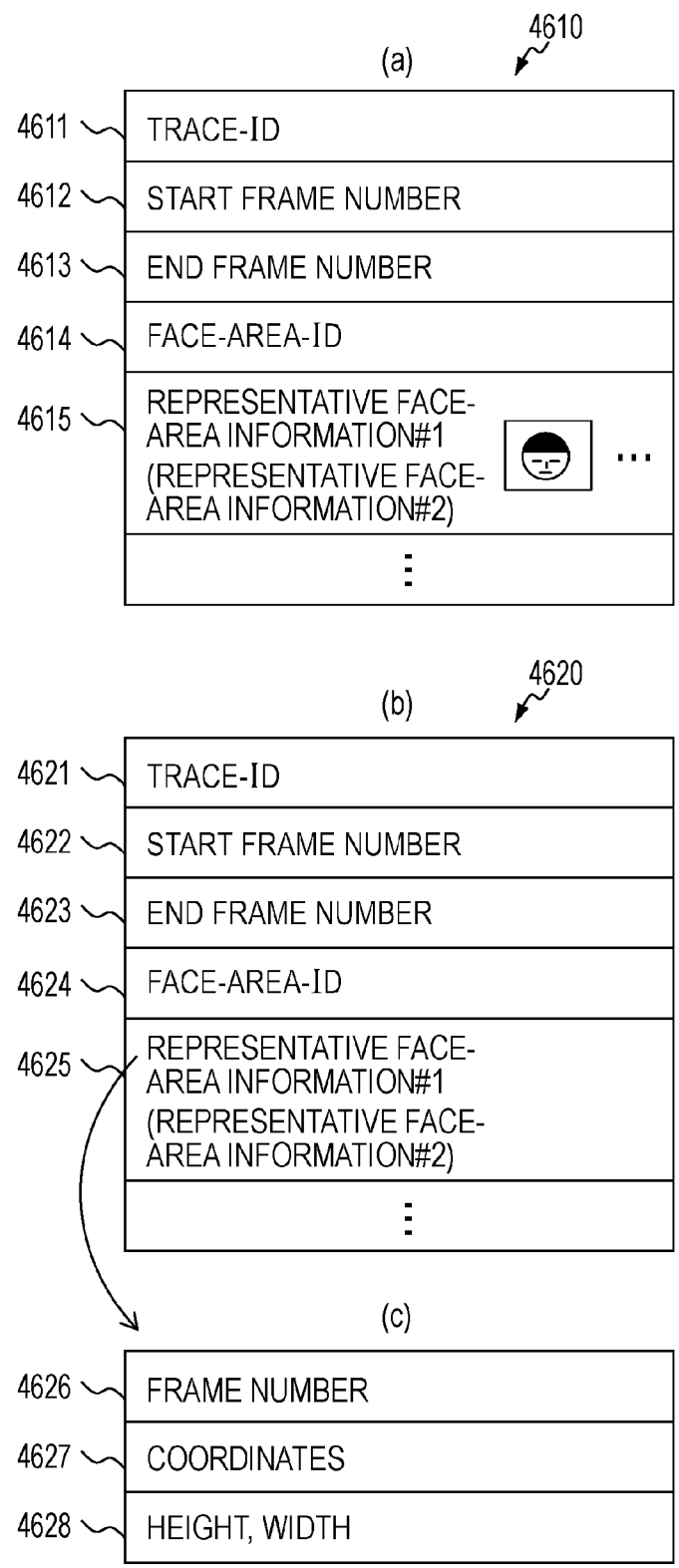
FIG. 9 is a diagram illustrating the contents of trace information in the embodiment of the present invention.

FIG. 9 is a diagram illustrating the contents of trace information in the embodiment of the present invention. FIG. 9A illustrates an example of trace information in the embodiment of the present invention. Trace information 4610 shown in FIG. 9A includes a trace-ID 4611, a start frame number 4612, an end frame number 4613, a face-characteristic-ID 4614, and representative face-area information 4615.

The trace-ID 4611 is a unique identification given to each trace for distinguishing each trace, and is the same identification described in FIG. 2. The start frame number 4612 is a frame number at which the trace is started, the end frame number 4613 is a frame number at which the trace is terminated.

The face-characteristic-ID 4614 is an identification of face-area characteristic data. As described in FIG. 2, the face-area characteristic data to which the same face-characteristic-ID is given has a similar face-area characteristic to each other. That is to say, the trace information having the same face-characteristic-ID 4614 has face area having a similar characteristic. The face-characteristic-ID 4614 is referenced when a face area having a similar characteristic is retrieved. The representative face-area information 4615 is information representing the contents of the representative face area. In FIG. 9A, the face area cut out from the frame itself is the representative face-area information. In this regard, there may be two or more information representing the contents of the representative area in the representative face-area information 4615. In FIG. 9A, in addition to "representative face-area information#1", "representative face-area information#2" is shown as information representing the contents of the representative face-area.

The trance information 4620 shown in FIG. 9B includes a trace-ID 4621, a start frame number 4622, an end frame number 4623, a face-characteristic-ID 4624, and representative face-area information 4625. The difference between the trace information of FIG. 9A and that of FIG. 9B is representative face-area information. The contents are the same for the other points, and thus the description will be omitted. The representative face-area information 4625 in FIG. 9B includes the frame number 4626 including the representative face-area, predetermined coordinates 4627 in the face area, and the height and width 4628 of the face area as shown in FIG. 9C. The face area in a frame is identified by these, and is acquired as the representative face area.

Figure 10:
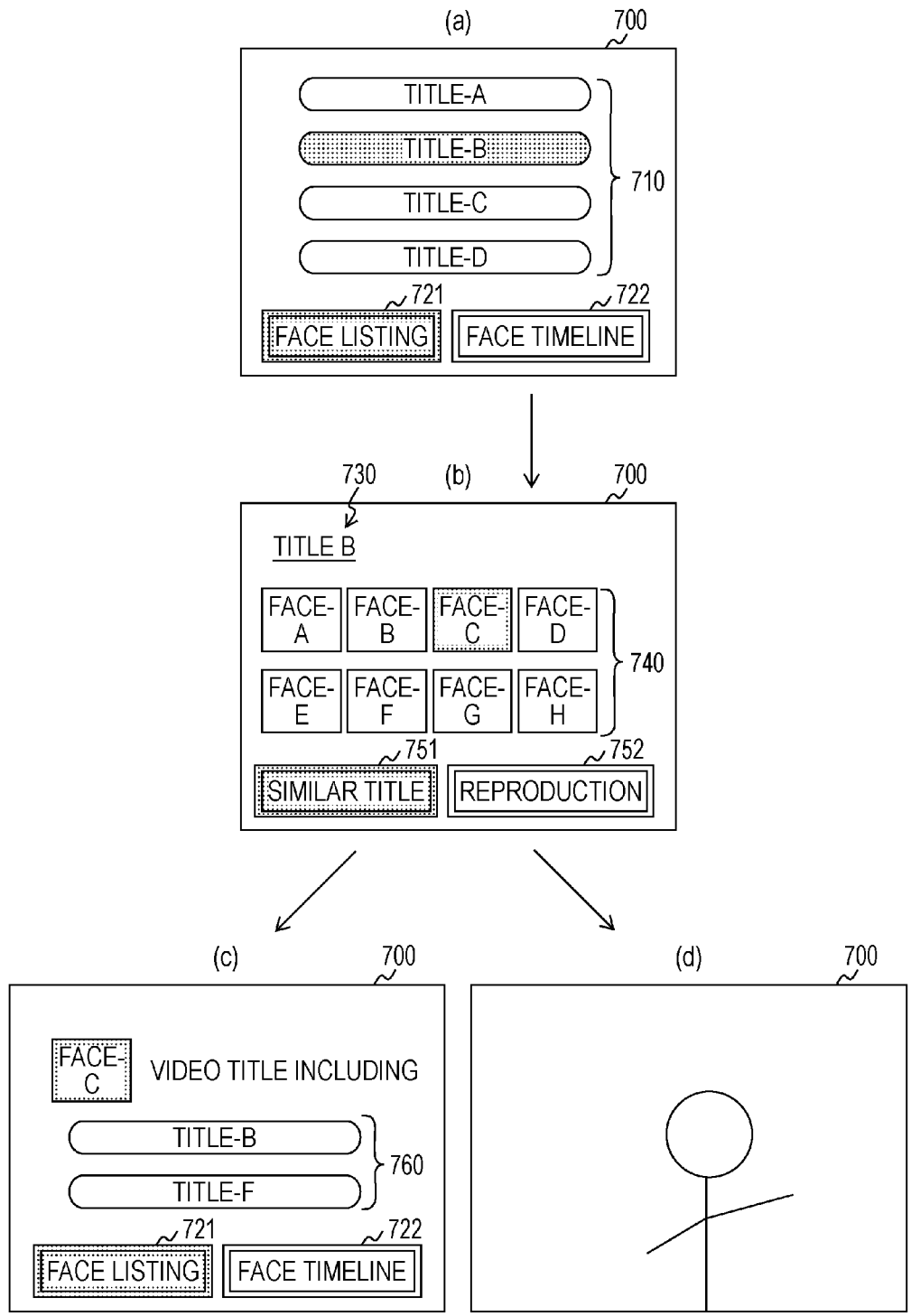
FIG. 10 is a diagram illustrating displays of an operation menu in the embodiment of the present invention.

FIG. 10 is a diagram illustrating displays of an operation menu in the embodiment of the present invention. As shown in FIG. 10A, a display screen 700 of the display section 70 shows an operation menu including video-data title display group 710, which is a set of titles of the video data, a face listing button 721, and a face timeline button 722. The face listing button 721 is a button for displaying a list of the representative face areas in the video data at which the cursor is located. Also, the face timeline button 722 is a button for displaying the face timeline, described in FIG. 3, of the video data at which the cursor is located.

For example, after the cursor is positioned at a predetermined video data title, if the face listing button 721 is selected, a screen shown as FIG. 10B is displayed on the display screen 700. The display screen 700 shown in FIG. 10B displays a selected video data display 730, a representative face listing group 740, which is a set of representative face areas, a similar title button 751, and a reproduction button 752.

The selected video data display 730 displays a title of the selected video data by the cursor in FIG. 10A. The representative face listing group 740 displays the representative face areas of the video data selected by the cursor. The similar title button 751 is a button for retrieving the titles of the video data including the representative face area similar to the representative face area selected in FIG. 10B. Also, the reproduction button 752 is a button for reproducing the video data forming the trace corresponding to the representative face area selected in FIG. 10B.

In the display screen 700 shown in FIG. 10B, if the cursor is moved to the representative face area "face C" and the similar title button 751 is selected, the screen displays as shown in FIG. 10C. At the same time, in the display screen 700 shown in FIG. 10B, if the cursor is moved to the representative face area "face C" and the reproduction button 752 is selected, the video data forming the trace corresponding to the representative face area "face C" is reproduced, and the screen displays as shown in FIG. 10D.

The display screen 700 in FIG. 10C displays a similar representative face-area video data title group 760, which is a display of the titles of the video data including the representative face areas similar to the representative face area "face C" selected by the cursor in FIG. 10B, the face listing button 721 shown in FIG. 10A, and the face timeline button 722. If any one of the similar representative face-area video data title group 760 is selected and the face listing button 721 is selected, the display screen 700 displays as shown in FIG. 10B.

Figure 11:
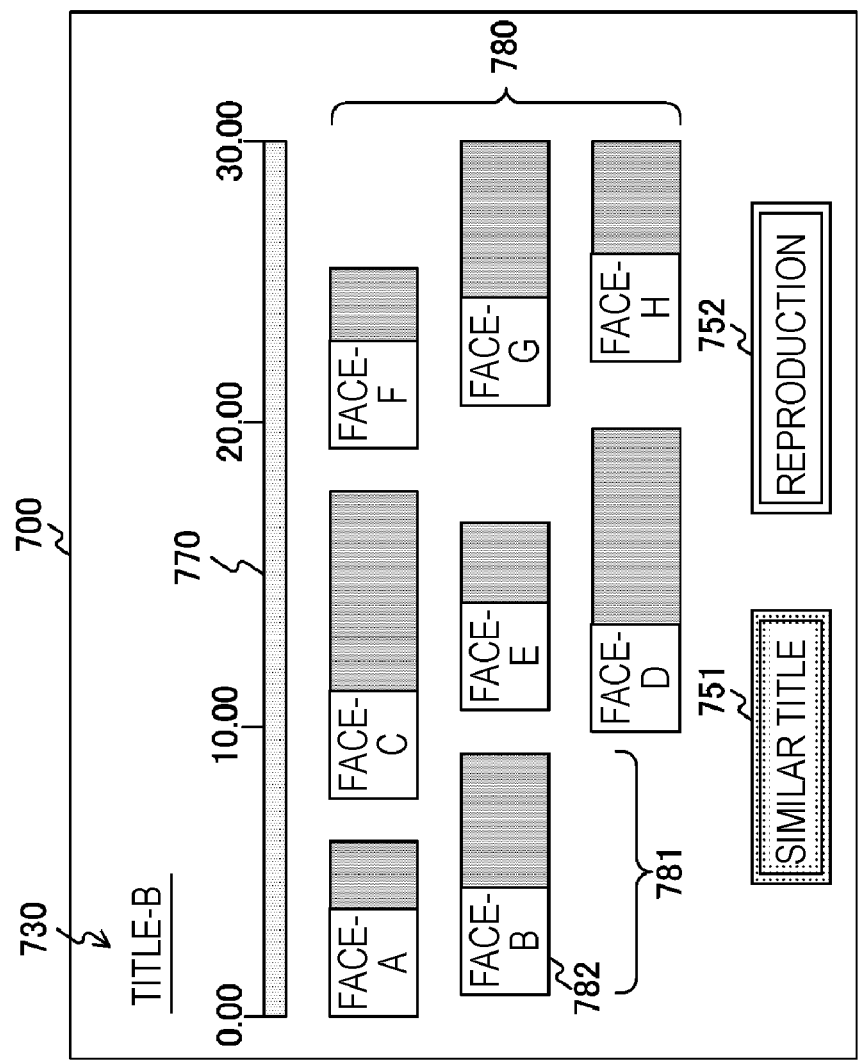
FIG. 11 is a diagram illustrating a display screen 700 when the face timeline button 722 has been selected in FIG. 10.

FIG. 11 is a diagram illustrating a display screen 700 when the face timeline button 722 has been selected in FIG. 10. The display screen 700 in FIG. 11 shows a selected video data display 730, a video-data timeline display 770, a face timeline display group 780, a similar title button 751, and a reproduction button 752.

The selected video data display 730 is the same as described in FIG. 10. The video-data timeline display 770 displays the reproduction time of the video data. In FIG. 11, the reproduction time of the video data of the title B is 30 minutes. The face timeline display group 780 is a set of face timeline displays.

The face timeline display includes a trace time display 781, and a representative face area 782. The trace time display 781 is the reproduction time of the video data forming the trace. The representative face area 782 is a face area selected from the face areas included in the frames forming the trace. By viewing the face timeline, the position of the trace in the video data is obtained, and thus it is convenient to grasp the contents of the video data. In this regard, the similar title button 751 and the reproduction button 752 are the same as ones described in FIG. 10.

Next, a description will be given of the operation of the video processing apparatus 100 according to the embodiment of the present invention with reference to the drawings.

Figure 12:
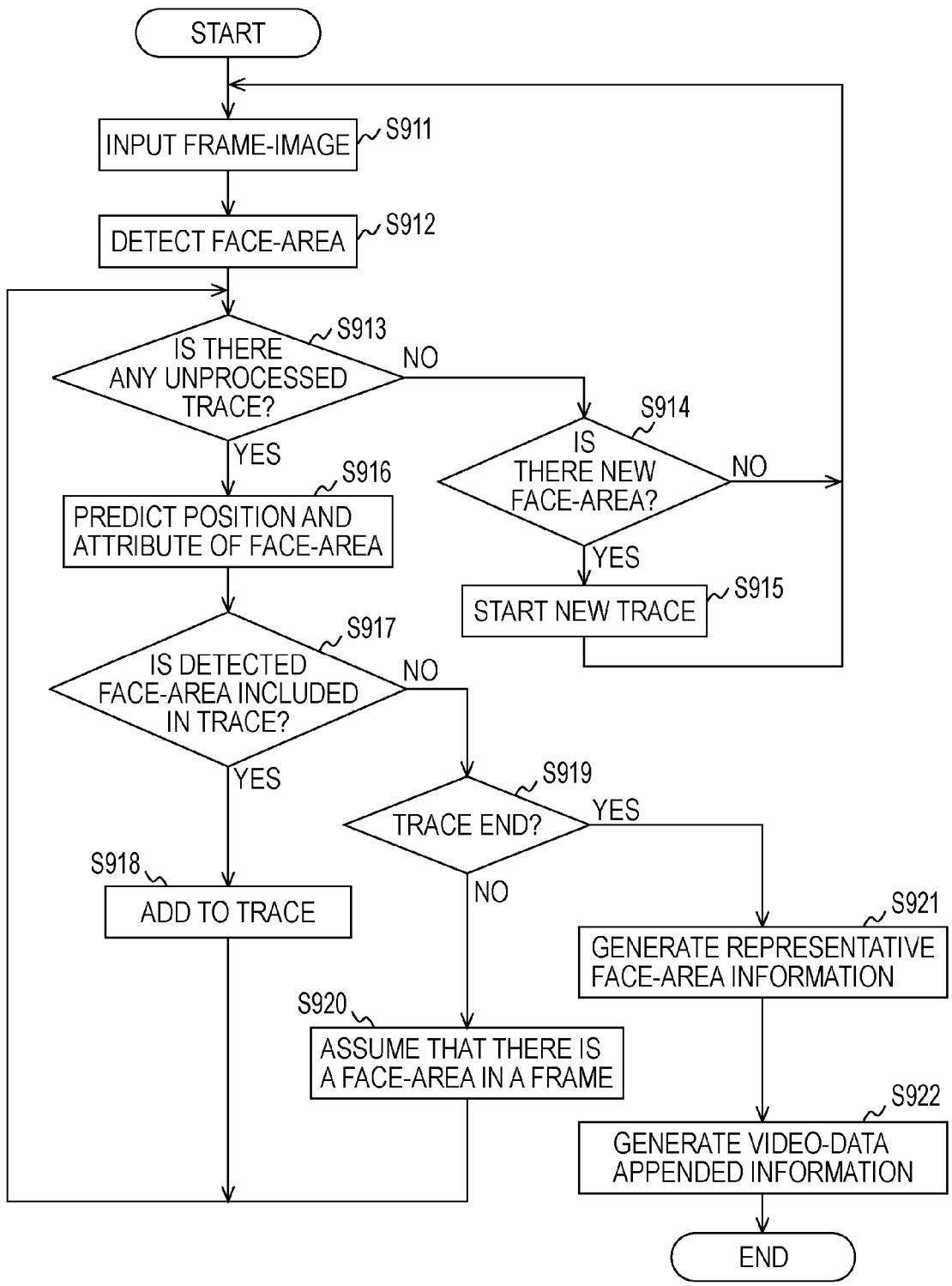
FIG. 12 is a diagram illustrating the process of generating video-data appended information in the video processing apparatus 100 in the embodiment of the present invention.

FIG. 12 is a diagram illustrating the process of generating video-data appended information in the embodiment of the present invention.

When frames forming video data are input into the face-area detection section 410 (step S911), the face-area detection section 410 detects face areas included in the frames (step S912). Next, a determination is made on whether there has been an unprocessed trace in step S912 (step S913).

If a determination is made that there has not been an unprocessed trace, a determination is made whether there is a new face area in step S912 (step S914). If a determination is made that there is a new face area, the generation of a new trace is started (step S915).

If a determination is made that there has been an unprocessed trace in step S913, a prediction is made on the position and the attribute of the face (step S916). Next, a comparison is made between the position and the attribute of the face predicted in step S916 and the position and the attribute of the face area detected in step S912, and a determination is made on whether the position and the attribute of the face area detected in step S912 are included in the trace (step S917). If a determination is made that the position and the attribute of the face area detected in step S912 are included in the trace, the detected face area is added to the trace (step S918).

On the other hand, if a determination is made that the position and the attribute of the face area detected in step S912 are not included in the trace, a determination is made on whether the trace is terminated (step S919). As described in FIG. 2, whether to terminate the trace is determined by, for example the case where the face area corresponding to the trace is not detected in the frames from the current frame to the frame after the elapse of a predetermined time period. An end frame is determined at the time when the above-described notification is received.

If a determination is made that the trace is not terminated, it is assumed that there is the face area in the frame, and the trace is continued (step S920). On the other hand, if the termination of the trace is determined, next, a representative face area is selected from the face area in the trace, and the representative face-area information is generated (step S921). The video-data appended information is generated on the basis of the frame number and the representative face-area information corresponding to the start and the end of the frames corresponding to the trace (step S922).

Figure 13:
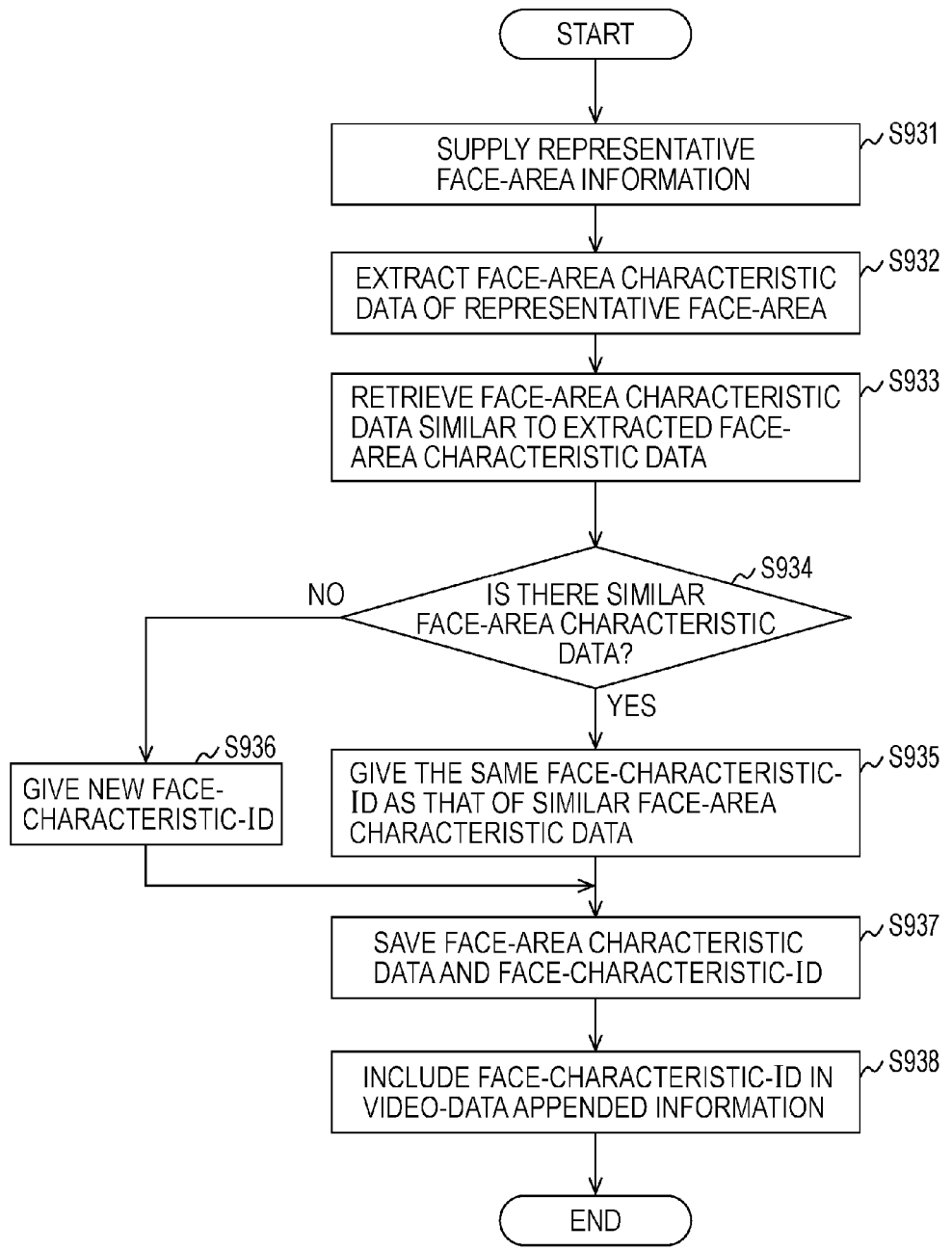
FIG. 13 is a diagram illustrating the process of giving face-characteristic-ID to a representative face area in the embodiment of the present invention.

FIG. 13 is a diagram illustrating the process of giving a face-characteristic-ID to a representative face area in the embodiment of the present invention. First, the representative face-area information is supplied to the face-area characteristic data extraction section 441 (step S931). When the representative face-area information is supplied, the face-area characteristic data extraction section 441 extracts the face-area characteristic data in the representative face area on the basis of the representative face-area information (step S932). Then the face-area characteristic data extracted in the face-area characteristic data extraction section 441 is supplied to the face-area characteristic data retrieval section 443.

The face-area characteristic data retrieval section 443 retrieves the face-area characteristic data similar to the supplied face-area characteristic data from the face-area characteristic data holding section 442 (step S933). Then the face-area characteristic data retrieval section 443 determines whether the face-area characteristic data similar to the supplied face-area characteristic data is held in the face-area characteristic data holding section 442 (step S934).

In step S934, if a determination is made that the face-area characteristic data similar to the supplied face-area characteristic data is held in the face-area characteristic data holding section 442, the face-area characteristic data retrieval section 443 gives the face-characteristic-ID corresponding to the face-area characteristic data held in the face-area characteristic data holding section 442 to the supplied face-area characteristic data (step S935).

On the other hand, in step S934, if a determination is made that the face-area characteristic data similar to the supplied face-area characteristic data is not held in the face-area characteristic data holding section 442, the face-area characteristic data retrieval section 443 gives a new face-characteristic-ID to the supplied face-area characteristic data (step S936).

When face-characteristic-ID is given to the supplied face-area characteristic data in steps S935 and S936, the face-area characteristic data supplied in the face-area characteristic data holding section 442 and the face-characteristic-ID are held in connection with each other (step S937). Also, the face-characteristic-ID given to the supplied face-area characteristic data is supplied to the video-data appended information generation section 450, and the face-characteristic-ID is included in the video-data appended information (step S938).

Figure 14:
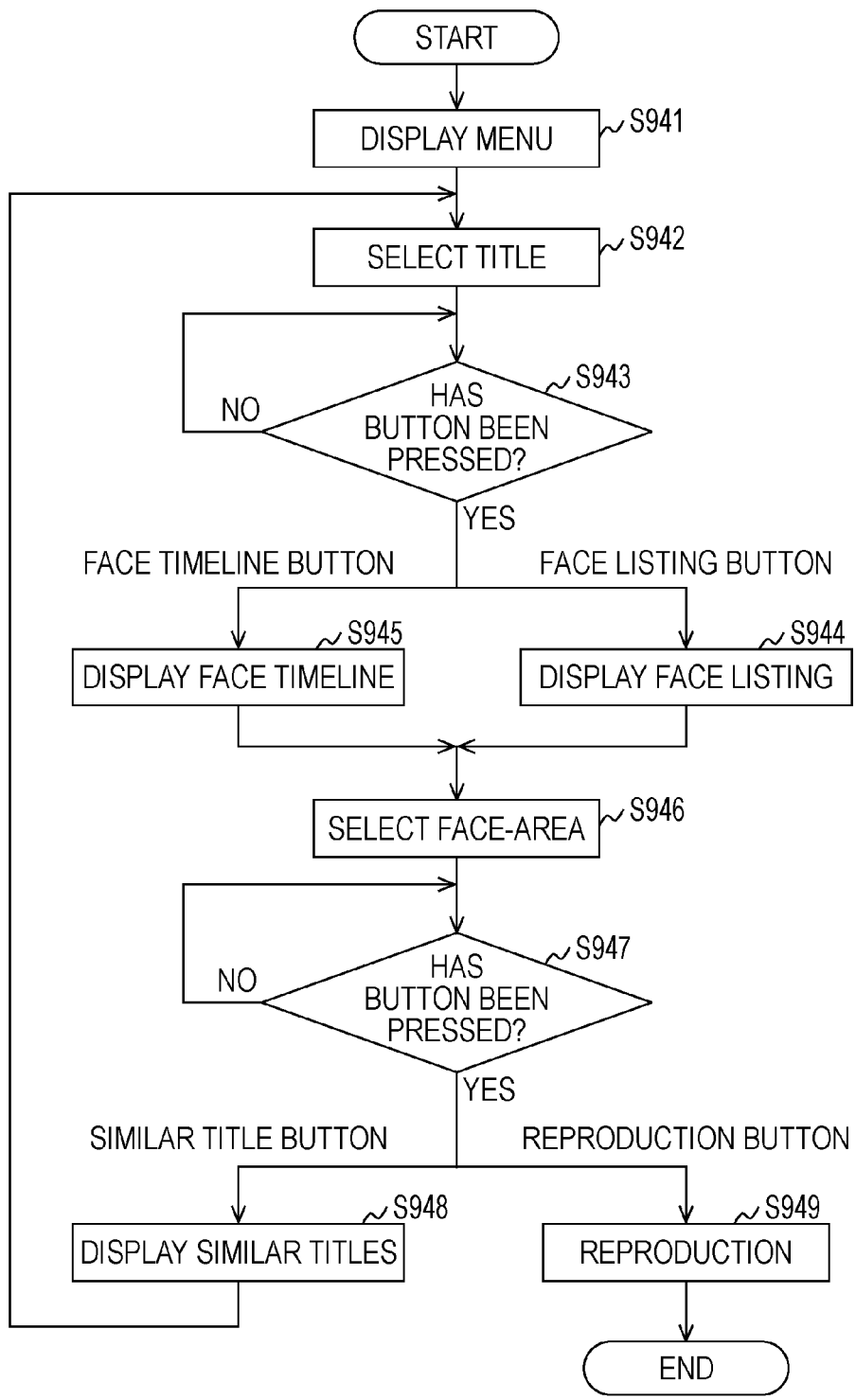
FIG. 14 is a diagram illustrating the operation flow of an operation menu in the embodiment of the present invention.
Figure 15A:
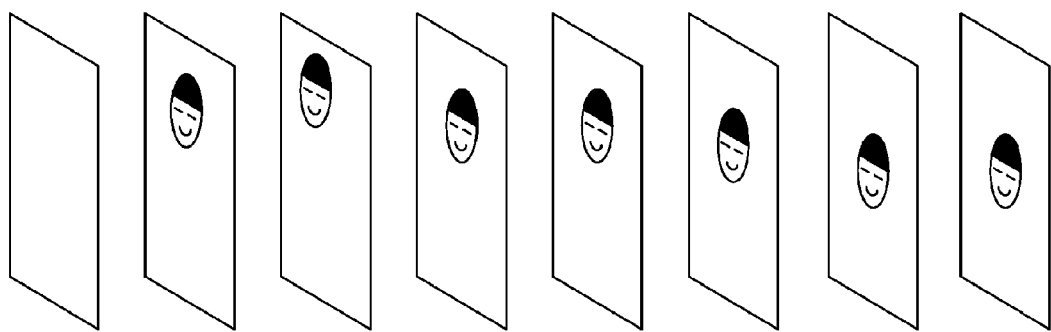
FIGS. 15A and 15B are diagrams illustrating the state of detecting a face area in video data.
Figure 15B:
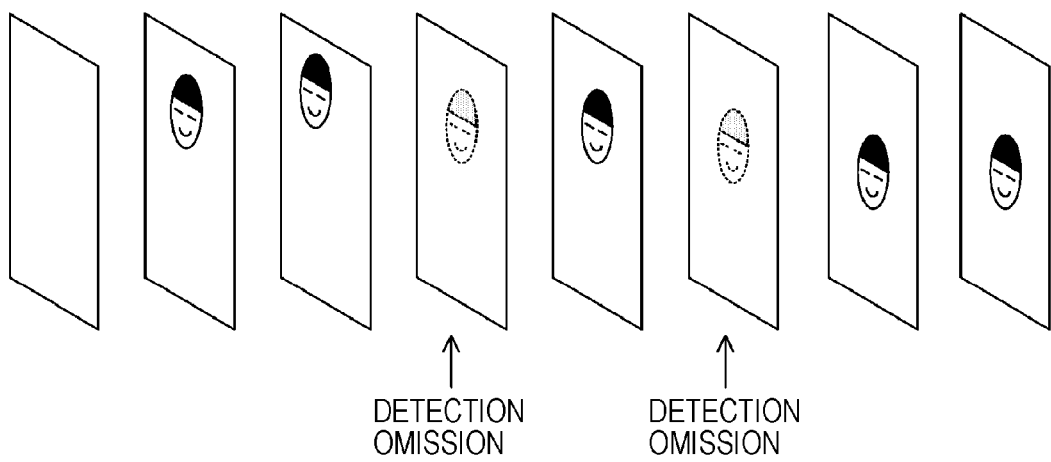

FIG. 14 is a diagram illustrating the operation flow of an operation menu in the embodiment of the present invention. First, an operation menu is displayed on the display section 70 (step S941). In this regard, for an operation menu, the operation menu shown in FIG. 10 is assumed. In the following, a description will be given on the assumption of the operation menu in FIG. 10.

The title of predetermined video data is selected from the operation menu (step S942). Next, either button of the face listing button 721 or the face timeline button 722 is selected (step S943). If the face listing button 721 is selected, a representative face listing group 740 is displayed (step S944). On the other hand, if the face timeline button 722 is selected, a face timeline display group 780 is displayed (step S945).

Next, a representative face area is selected either from the representative face listing group 740 or the face timeline display group 780 (step S946). After the representative face area is selected, either of the similar title button 751 or the reproduction button 752 is selected (step S947).

If the similar title button 751 is selected, a similar representative face-area video data title display group 760, which is a set of the titles of the video data including representative face areas similar to the representative face area selected in step S946, is displayed, an the processing returns to step S942 (step S948). On the other hand, if the reproduction button 752 is selected, the video data constituting the trace corresponding to the representative face area selected in step S946 is reproduced (step S949).

In this manner, according to an embodiment of the present invention, video-data appended information, which relates video data to information of continuous appearances of face areas, is generated, and thus many persons appearing in a vast number of frames are managed efficiently. Also, in the embodiment of the present invention, even if there is a detection omission in the detection of face areas, information of the continuous appearances of a face area can be generated. Thus, it is possible for a user to grasp the contents of video data in a short period of time.

In this regard, the embodiment of the present invention is described as an example for realizing the present invention. The present invention is not limited to this, and various changes and modifications may be made in the invention without departing from the spirit and scope of the invention.

That is to say, according to an embodiment of the present invention, the face-area detection means corresponds to, for example the face-area detection section 410. Also, the trace generation means corresponds to, for example the trace generation section 420. Also, the representative face-area information generation means corresponds to, for example the representative face-area information generation section 430. Also, the video-data appended information generation means corresponds to, for example the video-data appended information generation section 450.

Also, according to an embodiment of the present invention, the trace-ID giving means corresponds to, for example the trace-ID giving section 421. Also, the face-area prediction means corresponds to, for example the face-area prediction section 423. Also, the trace determination means corresponds to, for example the trace determination section 424. Also, the end-frame determination means corresponds to, for example the end-frame determination section 425.

Also, according to an embodiment of the present invention, the face-area characteristic data holding means corresponds to, for example the face-area characteristic data holding section 442, the face-area characteristic data extraction means corresponds to, for example the face-area characteristic data extraction section 441, and the face-area characteristic data retrieval means corresponds to, for example the face-area characteristic data retrieval section 443.

Also, according to an embodiment of the present invention, the video-data appended information holding means corresponds to, for example the video-data appended information holding section 460. Also, the operation-menu list generation means corresponds to, for example the operation-menu list generation section 470. Also, the display means corresponds to, for example the display section 70. Also, the operation input means corresponds to, for example the operation input section 90.

Also, according to an embodiment of the present invention, the face-area acquisition means corresponds to, for example the face-area acquisition section 483.

Also, according to an embodiment of the present invention, the similar face-area retrieval means corresponds to, for example the similar face-area retrieval section 482.

Also, according to an embodiment of the present invention, the face timeline generation means corresponds to, for example the face timeline generation section 481.

Also, according to an embodiment of the present invention, the face-area detection step corresponds to, for example step S912. Also, the trace generation step corresponds to, for example steps S913 to S920. Also, the representative face-area information generation step corresponds to, for example step S921. Also, the video-data appended information generation step corresponds to, for example step S922.

In this regard, the processing procedure described in the embodiment of the present invention may be regarded as a method having the series of steps. Alternatively, the present invention may be regarded as a program for causing a computer to execute this series of steps, or a recording medium for storing the program.

It should be understood by those skilled in the art that various modifications, combinations, sub-combinations and alterations may occur depending on design requirements and other factors insofar as they are within the scope of the appended claims or the equivalents thereof.

What is claimed is:

1. A video processing apparatus comprising:
a face-area detection section which detects a face area included in a frame forming video data;
a trace-generation section which generates a frame identification corresponding to a start and an end of a trace including, as a unit, a set of frames from an appearance of the face area to a disappearance of the face area on the basis of the detection;
a representative face-area information generation section which selects a representative face area from the face area included in frames forming the trace and generates representative face-area information representing content of the representative face area;
a video-data appended information generation section which generates video-data appended information relating the frame identification corresponding to a start and an end of the trace to the representative face-area information for the video data;
a face-area characteristic data holding section which holds face-area characteristic data describing a predetermined face-area characteristic and face-characteristic identification identifying the face-area characteristic data in connection with each other;
a face-area characteristic data extracting section which extracts face-area characteristic data from the representative face area cut out by the face-area information generation section; and
a face-area characteristic data retrieval section which retrieves the face-area characteristic data similar to the extracted face-area characteristic data by the face-area characteristic data holding section, and giving the face-area characteristic identification to the extracted face-area data,
wherein,
the trace generation-section includes (a) a trace-identification section which gives the same trace-identification to frames from the appearance of the face area to the disappearance, (b) a face-area prediction section which predicts the face area in a current frame on the basis of the face area in prior frames having the same trace-identification given, and (c) an end-frame determination section which determines any one of the frames to be an end frame of the trace if the face area in the current frame detected by the face-area detection section is determined not to be included in the trace,
the trace-identification section includes a trace-determination section which (a) compares the face area in the predicted current frame and the face area in the current frame detected by the face-area detection section to determine whether a difference in position and a difference in at least one facial attribute meet or are less than predetermined threshold values for the face area position and the at least one facial attribute, (b) includes the face area in the trace if the difference in position and difference in at least one facial attribute are equal to or less than the predetermined threshold values (c) starts a new trace if the difference between the position and the difference in at least one facial attribute is greater than the predetermined threshold values for the face area position and the at least one facial attribute, the representative face-area information generation section generates the representative face area cut out from a frame including the representative face area as the representative face-area information,
the video-data appended information generation section generates the video-data appended information including the face-area characteristic identification, and
a new face-characteristic identification is given to the extracted face area data when the face-area characteristic data similar to the face-area characteristic data extracted by the face-area characteristic data retrieval section is not retrieved by the face-area characteristic data holding section.

2. The video processing apparatus according to claim 1, wherein the face-area prediction section predicts the face area in the current frame by linear prediction on the basis of the face area in a prior frame having the same trace-identification given.

3. The video processing apparatus according to claim 1, wherein the trace-determination section determines whether the difference in the facial attribute is a equal to or less than the predetermined based on at least one the following characteristics (a) factor of a size of the face area, (b) a luminance distribution of the face area, (c) a color distribution of the face area, (d) a shape of the face area, and (e) a pattern of the face area as the attribute.

4. The video processing apparatus according to claim 1, wherein the end-frame determination section determines the end frame of the trace based on a determination of the trace-determination section for subsequent frames when the face area in the current frame detected by the face-area detection means is not included in the trace.

5. The video processing apparatus according to claim 1, wherein the representative face-area information generation section selects the representative face area on the basis of at least one factor of (a) a size of the face area in frames forming the trace, (b) a frequency distribution in the face area, (c) a shade distribution of color in the face area, and (d) a color distribution in the face area.

6. The video processing apparatus according to claim 1, wherein the representative face-area information generation section generates a frame number of the frame including the representative face area, and a position and a size of the representative face area in a frame including the representative face area as the representative face-area information.

7. The video processing apparatus of claim 1, further comprising:
a video-data appended information holding section which holds the video-data appended information, the video-data appended information relating the frame identification corresponding to a start and an end of a trace including, as a unit, a set of frames from an appearance of a face area to a disappearance to representative face-area information representing content of representative face area selected from the face area included in frames forming the trace;
an operation-menu list generation section which generates a list of operation menu on the video data on the basis of the video-data appended information;
a display section which displays an operation menu on the video data; and
an operation input section which accepts a selection of the operation menu on the video data.

8. The video processing apparatus according to claim 7, further comprising:

a face-area acquisition section which accepts the video-data appended information on the selected video data when predetermined video data is selected from a list of the video data by the operation input section, and displaying the face area on the basis of the representative face-area information included in the video-data appended information.

9. The video processing apparatus according to claim 8, further comprising a similar face-area retrieval section,
   wherein,
      when any one of the face areas displayed by the face-area acquisition section is selected by the operation input section, a similar face-area retrieval section retrieves video-data appended information having the same face-area characteristic identification as that of the selected face area and displaying the retrieval result, and
      the video-data appended holding section holds face-area characteristic identification given to face-area characteristic data describing a predetermined face-area characteristic of the video data and the representative face-area information in connection with each other.

10. The video processing apparatus according to claim 7, further comprising:
    a face timeline generation section which acquires the video-data appended information on the selected video data when predetermined video data is selected from a list of the video data by the operation input section, and generating a face timeline display including time display corresponding to the trace and the face area corresponding to the representative face-area information.

11. A method of processing a video data stream to identify a human face, the method comprising the steps of:
    detecting a face area included in a frame of the video stream using a video processing apparatus;
    generating via the video processing apparatus a frame identification corresponding to a start and an end of a trace including, as a unit, a set of frames from an appearance of the face area to a disappearance of the face area on the basis of the detection;
    selecting via the video processing apparatus a representative face area from the face area included in the frames forming the trace and generating representative face-area information representing contents of the representative face area;
    generating via the video processing apparatus information relating the frame identification corresponding to a start and an end of the trace to the representative face-area information for the video data as video-data appended information appended to the video data;
    generating via the video processing apparatus video-data appended information relating the frame identification corresponding to a start and an end of the trace to the representative face-area information for the video data;
    holding in a face-area generation device configured to hold data face-area characteristic data describing a predetermined face-area characteristic and face-characteristic identification identifying the face-area characteristic data in connection with each other, the face-area generation device is a part of the video processing apparatus;
    extracting via the video processing apparatus face-area characteristic data from the representative face area cut out by a face-area information generation device;
    retrieving via the video processing apparatus the face-area characteristic data similar to the extracted face-area characteristic data by a face-area characteristic data holding device, and giving the face-area characteristic identification to the extracted face-area data;
    generating via the video processing apparatus the representative face area cut out from a frame including the representative face area as the representative face-area information;
    generating via the video processing apparatus the video-data appended information including the face-area characteristic identification; and
    giving via the video processing apparatus a new face-characteristic identification to the extracted face area data when the face-area characteristic data similar to the face-area characteristic data extracted by the face-area characteristic data retrieval section is not retrieved by the face-area characteristic data holding section,
    wherein,
       the video processing apparatus includes (a) a trace-identification section which gives the same trace-identification to frames from the appearance of the face area to the disappearance, (b) a face-area prediction section which predicts the face area in a current frame on the basis of the face area in prior frames having the same trace-identification given, and (c) an end-frame determination section which determines any one of the frames to be an end frame of the trace if the face area in the current frame detected by the face-area detection section is determined not to be included in the trace, and
       the trace-identification section includes a trace-determination section which (a) compares the face area in the predicted current frame and the face area in the current frame detected by the face-area detection section to determine whether a difference in position and a difference in at least one facial attribute meet or are less than predetermined threshold values for the face area position and the at least one facial attribute, (b) includes the face area in the trace if the difference in position and difference in at least one facial attribute are equal to or less than the predetermined threshold values (c) starts a new trace if the difference between the position and the difference in at least one facial attribute is greater than the predetermined threshold values for the face area position and the at least one facial attribute,
       the representative face-area information generation section generates the representative face area cut out from a frame including the representative face area as the representative face-area information,
       the video-data appended information generation section generates the video-data appended information including the face-area characteristic identification, and
       a new face-characteristic identification is given to the extracted face area data when the face-area characteristic data similar to the face-area characteristic data extracted by the face-area characteristic data retrieval section is not retrieved by the face-area characteristic data holding section.

* * * * *